United States Patent [19]

Kobiske et al.

[11] Patent Number: 4,531,618
[45] Date of Patent: Jul. 30, 1985

[54] INTERCHANGEABLE STRUT BODY

[75] Inventors: Michael Kobiske; William Voigt, both of St. Charles; Kris Sharma, Lombard, all of Ill.

[73] Assignee: Maremont Corporation, Carol Stream, Ill.

[21] Appl. No.: 471,509

[22] Filed: Mar. 2, 1983

[51] Int. Cl.³ .............................................. F16F 9/32
[52] U.S. Cl. ................... 188/321.11; 138/106; 188/152; 280/668
[58] Field of Search ............ 188/321.11, 152, 274, 188/2 D, 17, 18 A, 18 R, 322.12, 382, 322.19, 264, 322.11; 267/8 R, 34, 64.15; 280/668, 673; 138/106, 107; 248/49, 58, 65, 66, 67, 74, 75

[56] References Cited

U.S. PATENT DOCUMENTS

| | | | |
|---|---|---|---|
| 1,598,661 | 9/1926 | Smith | 188/2 D |
| 1,862,105 | 6/1932 | Wharam | 188/2 D |
| 1,940,456 | 12/1933 | Kohr | 188/2 D X |
| 2,030,218 | 2/1936 | Maxwell | 138/106 X |
| 2,099,756 | 11/1937 | Seigle | 138/106 X |
| 2,646,818 | 7/1953 | Bimpson | 138/106 X |
| 2,822,997 | 2/1958 | DuBois | 188/264 A X |
| 3,741,581 | 6/1973 | Patrin | 267/34 X |
| 3,851,672 | 12/1974 | De Vincent et al. | 138/106 |
| 3,853,148 | 12/1974 | De Vincent et al. | 138/106 X |
| 3,860,978 | 1/1975 | Wirth | 138/106 X |
| 3,917,308 | 11/1975 | Schulz | 280/668 X |
| 4,194,760 | 3/1980 | Shiomi et al. | 280/668 X |
| 4,223,903 | 9/1980 | Grabb et al. | 280/668 X |
| 4,261,446 | 4/1981 | Bolger | 188/322.11 |

FOREIGN PATENT DOCUMENTS

| | | | |
|---|---|---|---|
| 0068361 | 1/1983 | European Pat. Off. | 188/152 |
| 1075631 | 7/1967 | United Kingdom | 188/18 A |

Primary Examiner—Douglas C. Butler
Attorney, Agent, or Firm—Allegretti, Newitt, Witcoff & McAndrews, Ltd.

[57] ABSTRACT

A left-to-right interchangeable, vehicle suspension strut includes a left-to-right interchangeable functional line bracket plate and accommodating left and right brackets or bracket portions.

12 Claims, 7 Drawing Figures

INTERCHANGEABLE STRUT BODY

BACKGROUND OF THE INVENTION

This invention relates to vehicle suspension strut bodies, or members.

Vehicle suspension strut bodies have brackets used to secure functional lines such as brake lines or cables, to the strut bodies. The brackets prevent chafing of the functional lines, assure the lines rotate about the longitudinal strut axes as vehicle wheels are turned during cornering, and prevent undue stress at the connections between the lines and their fittings. In the past, functional line brackets have been asymmetrically mounted on vehicle suspension strut bodies, such that the bodies have been uniquely right or left hand. A desire to avoid interference between strut bodies and other vehicle components may have caused the asymmetry. As a result of the asymmetry, inventories for vehicle suspensions have required unique stocks of both right and left hand strut bodies, to be complete.

SUMMARY OF THE INVENTION

An object of this invention is to provide a vehicle suspension strut body that eliminates stocking of right and left hand strut bodies.

Another object is to provide a strut body which avoids interference with other vehicle components.

Yet other objects include the provision of strut bodies which accomplish the preceding objects without asymmetry, yet are substantially equal to prior art strut bodies in price and in performance as to functional lines, brackets and bracket attachments.

These objects are all accomplished by the invention, which, in a principal aspect, is a left-to-right interchangeable vehicle suspension strut member. A tubular strut outer cylinder has an exterior. A functional bracket is on the cylinder exterior. The bracket includes an arcuate central portion and two end portions. The central portion fits about the cylinder exterior, extending circumferentially about a portion of the cylinder. The first end portion is attached to the central portion, and extends outward away from the cylinder exterior a non-interfering distance. The second end portion is attached to the central portion opposite the first end portion and also extends outward away from the cylinder exterior the non-interfering distance. A functional bracket plate is adapted to be received by the bracket end portion. A mounting means is on the functional brackets and the bracket plate for interchangeably mounting the functional bracket plate to one of the end portions of the functional bracket.

BRIEF DESCRIPTION OF THE DRAWING

The accompanying drawing consists of seven figures, or FIGS. These figures are.

DETAILED DESCRIPTION OF THE PREFERRED EMBODIMENT

Figure 1:
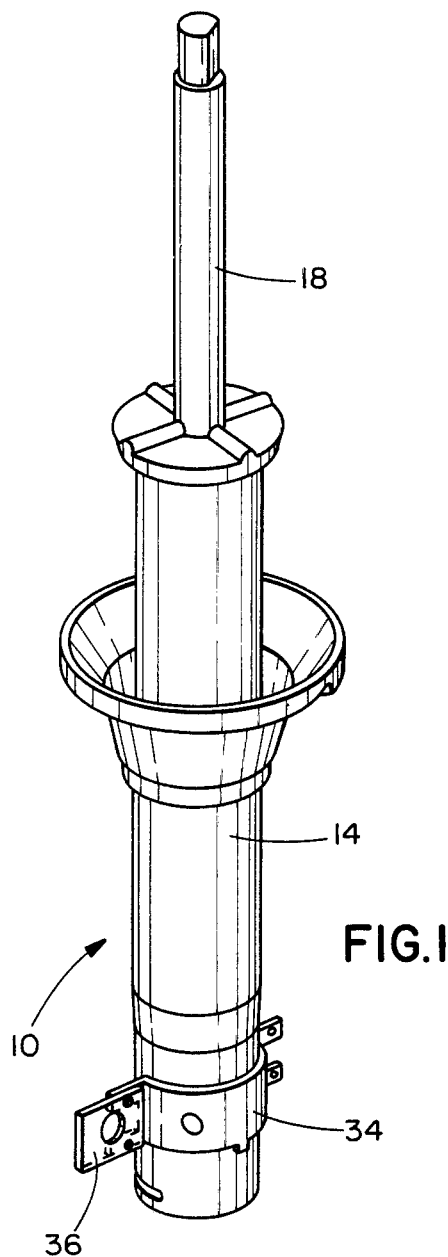
FIG. 1, a perspective view of a front strut body including a preferred front brake line bracket assembly.
Figure 5:
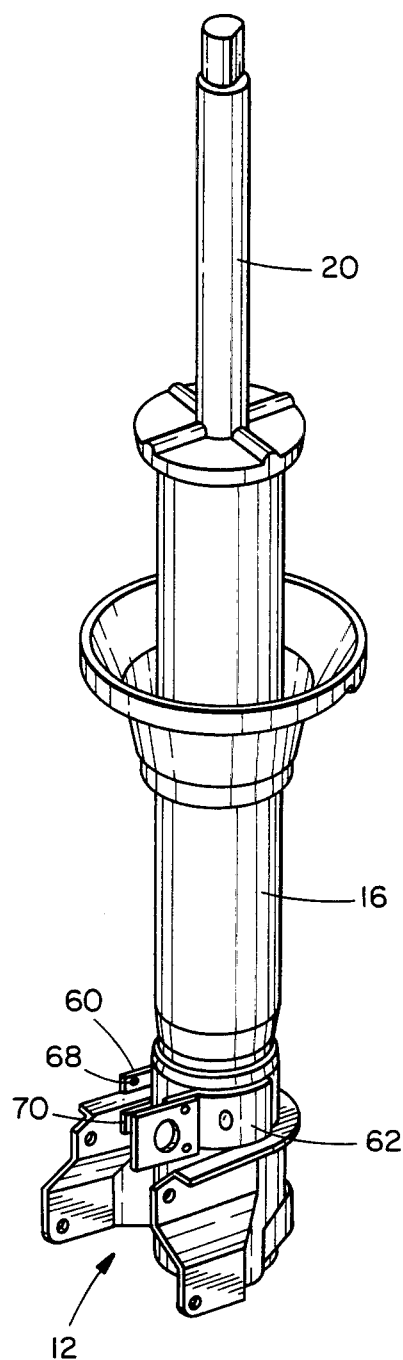
FIG. 5, a perspective view of a rear strut body including a rear brake line bracket assembly.
Figure 7:
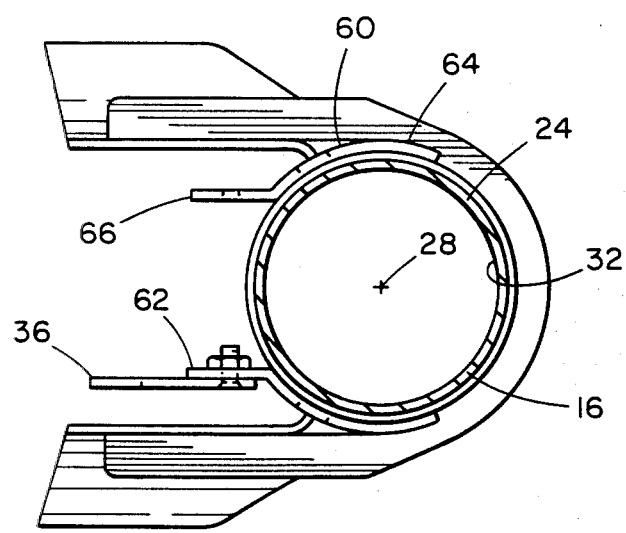
FIG. 7, a cross-section view of the rear strut body of FIGS. 5 and 6, taken along line 7—7 of FIG. 6.

Referring to FIGS. 1 and 5 of the accompanying drawing, a preferred front strut body 10 and a preferred rear strut body 12 include tubular strut outer cylinders 14, 16 with rods 18, 20, respectively. The cylinders 14, 16 are elongated, cylindrical, and as shown in FIGS. 3 and 7, include, respectively, thin, circular cylinder walls 22, 24 centered about strut centerlines 26, 28 within hollow interiors 30, 32.

Figure 3:
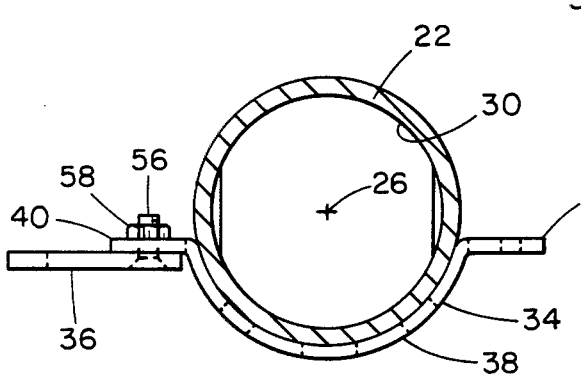
FIG. 3, a cross-section view of the front strut body of FIGS. 1 and 2, taken along line 3—3 of FIG. 2.
Figure 2:
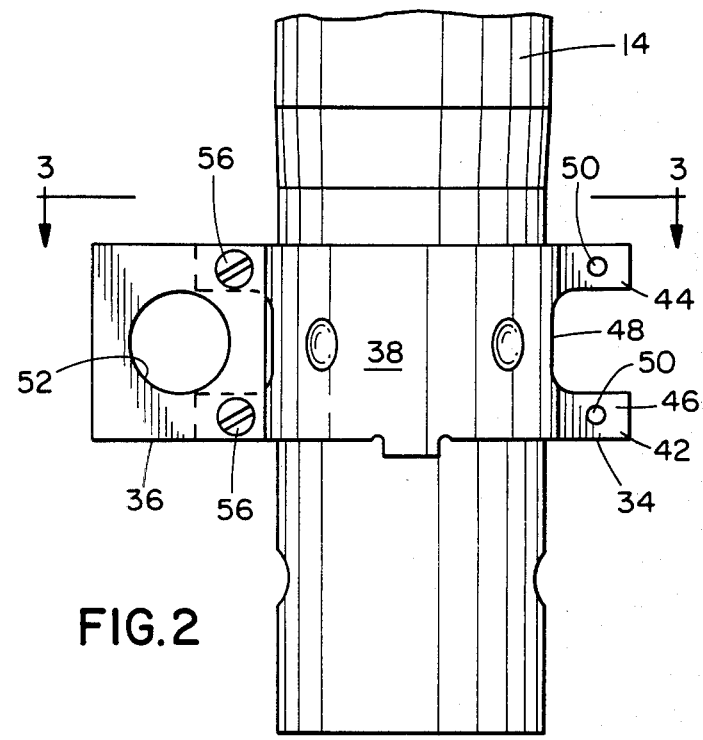
FIG. 2, a partial side view of the front strut body of FIG. 1.

A preferred front brake line bracket assembly shown in FIGS. 1-4 includes a front brake line bracket 34 and a brake line bracket plate 36. An arcuate or partially annular central portion 38 of the bracket 34 is fitted and mounted to the exterior of the front cylinder 14 at the lower end of the cylinder 14. The central portion 38 extends circumferentially around a portion of the cylinder exterior, in contact with the cylinder wall 22. As best seen in FIG. 3, the circumferential extent of the central portion 38 is less than semicircular, or about 145°. The center of curvature of the central portion 38 is the strut centerline 26.

Planar end portions 40, 42 of the bracket 34 extend from the opposite ends of the central portion 38 outward, away from the cylinder 14, in a single plane parallel to the strut centerline 26. The end portions 40, 42 are attached to the central portion 38, as integral portions of the bracket 34. Referring to the end portion 42 as an example, each end portion 40, 42 includes two mounting tabs 44, 46 separated from each other across a rectangular opening 48. Fastener mounting holes 50 are provided in the tabs 44, 46.

The bracket 34 is symmetric about the strut centerline 26. The end portions 40, 42 join the central portion 38 equidistant from the centerline 26, and each end portion 40, 42 ends at a single, non-interfering distance from the cylinder wall 22. As most preferred, the tabs 44, 46 of the end portions 40, 42 extend from the wall 22 only so far, and are only so wide, as necessary for strength about the fastener holes 50.

Figure 4:
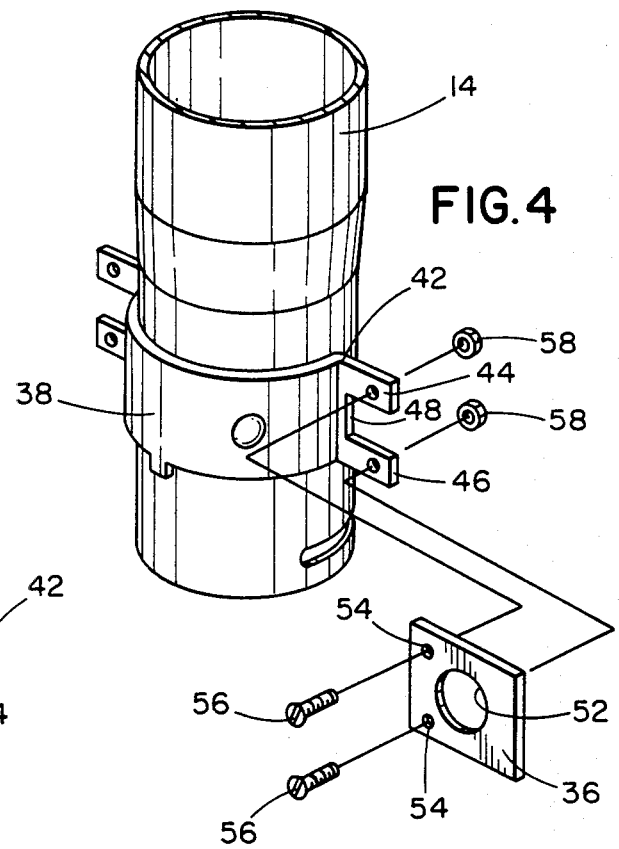
FIG. 4, perspective view of the front strut body of FIGS. 1-3, with a front brake line bracket assembly exploded.

The bracket plate 36 is rectangular and most preferably square, with a centered brake line opening 52. Two fastener holes 54 are adjacent the brake line opening 52, at a distance apart from each other equal to the distance between the bracket fastener holes 50. The plate 36 is thus adapted to receive and hold a brake line, and to be mounted interchangeably on one of the end portions 40, 42 of the bracket 34. Interchangeable mounting of the plate 36 is defined as the mounting of the plate 36 to either of the end portions 40, 42, as desired, with the same ease of mounting. Comparing FIG. 4 to FIGS. 1-3, the plate 36 is mountable on either of the portions 40, 42. Fasteners such as the bolts 56 and nuts 58 of FIG. 4 provide the mounting.

When mounted, the plate 36 extends outward of the tabs 44, 46. The brake line opening 52 is properly positioned to receive a brake line. Because the plate 36 is mountable on either of bracket end portion 40, 42, the cylinder 14 is left-to-right interchangeable. It may be used in either a left hand strut assembly, or a right hand strut assembly.

Figure 6:
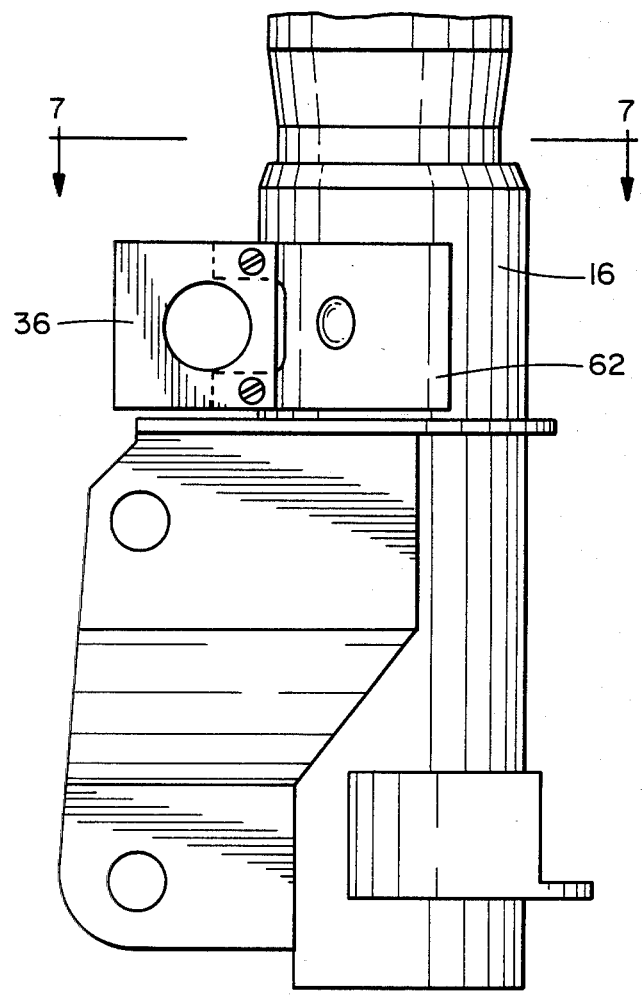
FIG. 6, a partial side view of the rear strut body of FIG. 5.

A preferred rear brake line bracket assembly shown in FIGS. 5-7 includes two rear brake line brackets 60, 62 and the brake line bracket plate 36. Referring to the bracket 60 as an example, the brackets 60, 62 each include an abbreviated arcuate portion 64 fitted to and extending circumferentially about a portion of the exterior of the rear cylinder 16, with an end portion 66 of two spaced tabs 68, 70 extending away from the cylinder exterior. The end portions 66 of the brackets 60, 62 extend parallel to each other and to the centerline 28. Remaining details of the brackets 60, 62 are similar to those of the bracket 34.

Preferred, front and rear brake line bracket assemblies in left-to-right interchangeable, vehicle suspension strut members are now described. Various modifications may be made to the assemblies. As an example, the circumferential extent of the central portion 38 of the bracket 34 may be increased beyond 180°. The bracket 34 may be asymmetrical about the strut centerline 26. The bracket plate 36 may be any desired, suitable shape. To particularly point out and distinctly claim the subject matter regarded as invention, claims conclude this specification.

What is claimed is:

1. A vehicle suspension strut member for receiving and securing a functional line comprising:
    a tubular strut outer cylinder having an exterior;
    a functional line bracket on the cylinder exterior including
    an arcuate central portion fitted to the cylinder exterior and extending circumferentially about a portion of the strut outer cylinder, and
    a first end portion attached to the arcuate central portion and extending outward away from the cylinder exterior a non-interfering distance;
    a second end portion attached to the arcuate central portion opposite the first end portion and extending outward away from the cylinder exterior the non-interfering distance;
    a functional line bracket plate adapted to be received by the first and second end portions of the functional line bracket; and
    means on the first and second end portions of the functional line bracket and the functional line bracket plate for interchangeably mounting the functional line bracket plate to the first end portion of the functional line bracket and to the second end portion of the functional line bracket.

2. A strut member as in claim 1 in which the strut outer cylinder defines a strut centerline, the functional line bracket is symmetric about the strut centerline, the functional line bracket end portions extend in a single plane parallel to the strut centerline, the functional line bracket plate defines a plate centerline and is symmetric thereabout, and the mounting means includes a plurality of identical fasteners.

3. A vehicle suspension strut member for receiving and securing a functional line comprising:
    a tubular strut outer cylinder having an exterior;
    a first functional line bracket on the cylinder exterior including
    a first arcuate portion fitted to the cylinder exterior and extending circumferentially about a first portion of the strut outer cylinder, and
    a first end portion attached to the first arcuate portion and extending outward away from the cylinder exterior to a non-interfering distance;
    a second functional line bracket on the cylinder exterior including
    a second arcuate portion fitted to the cylinder exterior and extending circumferentially about a second portion of the strut outer cylinder, and
    a second end portion attached to the second arcuate portion and extending outward away from the cylinder exterior to the non-interfering distance;
    a functional line bracket plate adapted to be received by the first and second end portions of the first and second functional line brackets, respectively; and
    means on the first end portion of the first functional line bracket, the second end portion of the second functional line bracket and the functional line bracket plate for interchangeably mounting the functional line bracket plate to the first and second end portions of the first and second functional line brackets, respectively.

4. A strut member as in claim 3 in which the strut outer cylinder defines a strut centerline, the functional line brackets are symmetric about the strut centerline, the functional line bracket end portions extend in two planes parallel to each other and the strut centerline, the functional line bracket plate defines a plate centerline and is symmetric thereabout, and the mounting means includes a plurality of identical fasteners.

5. A vehicle suspension strut member for receiving and securing a functional line comprising:
    a tubular strut outer cylinder having an exterior;
    a functional line bracket on the cylinder exterior including
    an arcuate central portion fitted to the cylinder exterior and extending circumferentially about a portion of the strut outer cylinder,
    a first end portion attached to the arcuate central portion and extending outward away from the cylinder exterior a non-interfering distance;
    a second end portion attached to the arcuate central portion opposite the first end portion and extending outward away from the cylinder exterior the non-interfering distance;
    a functional line bracket plate adapted to be received by the end portions of the functional line bracket;
    means on the first and second end portions of the functional bracket and the functional line bracket plate for mounting the functional line bracket plate to the first end portion of the functional line bracket and to the second end portion of the functional line bracket; and
    the functional line bracket plate being mounted to the first end portion of the functional line bracket;
    whereby the functional line bracket plate may, as a matter of choice, remain mounted to the first end portion of the functional line bracket for mounting of the strut member on a first side of a vehicle, and be mounted to the second end portion of the functional line bracket for mounting of the strut member on the other side of the vehicle.

6. A strut member as in claim 5 in which the strut outer cylinder defines a strut centerline, the functional line bracket is symmetric about the strut centerline, the functional line bracket end portions extend in a single plane parallel to the strut centerline, the functional line bracket plate defines a plate centerline and is symmetric thereabout, and the mounting means includes a plurality of identical fasteners.

7. A vehicle suspension strut member for receiving and securing a functional line comprising:
    a tubular strut outer cylinder having an exterior;

a first functional line bracket on the cylinder exterior including a first arcuate portion fitted to the cylinder exterior and extending circumferentially about a first portion of the strut outer cylinder, and a first end portion attached to the first arcuate portion and extending outward away from the cylinder exterior to a non-interfering distance;

a second functional line bracket on the cylinder exterior including a second arcuate portion fitted to the cylinder exterior and extending circumferentially about a second portion of the strut outer cylinder, and a second end portion attached to the second arcuate portion and extending outward away from the cylinder exterior to the non-interfering distance;

a functional line bracket plate adapted to be received by the first and second end portions of the first and second functional line bracket, respectively;

means on the first end portion of the first functional line bracket, the second end portion of the second functional line bracket and the functional line bracket plate for mounting the functional line bracket plate to the first end portion of the first functional line bracket and to the second end portion of the second functional line bracket; and the functional line bracket plate being mounted to the first end portion of the first functional line bracket;

whereby the functional line bracket plate may, as a matter of choice, remain mounted to the first end portion of the first functional line bracket for mounting of a strut member on a first side of a vehicle, and be mounted to the second end portion of the second functional line bracket for mounting of the strut member on the other side of the vehicle.

8. A strut member as in claim 7 in which the strut outer cylinder defines a strut centerline, the functional line brackets are symmetric about the strut centerline, the functional line bracket end portions extend in two planes parallel to each other and the strut centerline, the functional line bracket plate defines a plate centerline and is symmetric thereabout, and the mounting means includes a plurality of identical fasteners.

9. A vehicle suspension strut kit for receiving and securing a functional line comprising:

a tubular strut outer cylinder having an exterior;

a functional line bracket adapted to be positioned on the cylinder exterior including an arcuate central portion adapted to be fitted to the cylinder exterior and extending circumferentially about a portion of the strut outer cylinder, a first end portion attached to the arcuate central portion and extending outward away from the cylinder exterior a non-interfering distance, and a second end portion attached to the arcuate central portion opposite the first end portion and extending outward away from the cylinder exterior the non-interfering distance;

a functional line bracket adapted to be mounted to the first and second end portions of the functional line bracket; and mounting means adapted to be used for mounting interchangeably the functional line bracket to the first end portion of the functional line bracket and to the second end portion of the functional line bracket.

10. A strut kit as in claim 9 in which the strut outer cylinder defines a strut centerline, the functional line bracket is adapted to be symmetric about the strut centerline, the functional line bracket end portions are adapted to extend in a single plane parallel to the strut centerline, and the functional line bracket plate defines a plate centerline and is symmetric thereabout, and the mounting means is adapted to include a plurality of identical fasteners.

11. A vehicle suspension strut kit for receiving and securing a functional line comprising:

a tubular strut outer cylinder having an exterior;

a first functional line bracket adapted to be positioned on the cylinder exterior including a first arcuate portion adapted to be fitted to the cylinder exterior and extending circumferentially about a first portion of the strut outer cylinder, and a first end portion attached to the first arcuate portion and extending outward away from the cylinder exterior to a non-interfering distance;

a second functional line bracket adapted to be positioned on the cylinder exterior including a second arcuate portion adapted to be fitted to the cylinder exterior and extending circumferentially about a second portion of the strut outer cylinder, and a second end portion attached to the second arcuate portion and extending outward away from the cylinder exterior to the non-interfering distance; and a functional line bracket plate adapted to be mounted to the first end portion of the first functional line bracket and to the second end portion of the second functional line bracket; and mounting means adapted to be used for mounting interchangeably the functional line bracket plate to the first end portion of the first functional line bracket and to the second end portion of the second functional line bracket.

12. A strut kit as in claim 11 in which the strut outer cylinder defines a strut centerline, the functional line brackets are adapted to be symmetric about the strut centerline, the functional line bracket end portions are adapted to extend in two planes parallel to each other and the strut centerline, the functional line bracket plate defines a plate centerline and is symmetric thereabout, and the mounting means is adapted to include a plurality of identical fasteners.

* * * * *